United States Patent [19]

Ramachandran et al.

[11] Patent Number: 5,090,865

[45] Date of Patent: Feb. 25, 1992

[54] WINDAGE SHIELD

[75] Inventors: Jairaj Ramachandran, Cincinnati; John R. Hess, West Chester; Larry W. Plemmons, Fairfield, all of Ohio

[73] Assignee: General Electric Company, Cincinnati, Ohio

[21] Appl. No.: 600,792

[22] Filed: Oct. 22, 1990

[51] Int. Cl.$^5$ ............................................. F01D 11/00
[52] U.S. Cl. ................................. 415/112; 415/115; 415/117; 415/170.1; 415/173.7; 285/41; 285/405; 403/337; 411/429; 411/910
[58] Field of Search ................ 415/112, 108, 170.1, 415/173.7, 174.4, 174.5, 115, 116, 117, 220; 411/910, 429; 285/41, 363, 405; 403/335-337

[56] References Cited

U.S. PATENT DOCUMENTS

| | | | |
|---|---|---|---|
| 3,670,497 | 6/1972 | Sheldon | 415/115 |
| 3,727,660 | 4/1973 | Burge . | |
| 4,190,397 | 2/1980 | Schilling et al. . | |
| 4,320,903 | 3/1982 | Ayache et al. | 415/110 |
| 4,662,821 | 5/1987 | Kirvistin et al. . | |
| 4,668,163 | 5/1987 | Kervistin | 415/115 |
| 4,883,407 | 11/1989 | Touze . | |
| 4,904,156 | 2/1990 | Touze . | |

*Primary Examiner*—Edward K. Look
*Assistant Examiner*—Christopher M. Verdier

*Attorney, Agent, or Firm*—Jerome C. Squillaro; John R. Rafter

[57] ABSTRACT

A windage shield for use with a pair of annular members oriented in an abutting end-to-end arrangement to define one boundary of a fluid flow path, each of the members having a radially extending flange at their respecting abutting ends for coupling the members to each other. The flanges are coupled by a plurality of circumferentially spaced bolts having a head and a nut which protrude into the fluid flow path. The windage shield comprises an annular ring having a first surface with a plurality of circumferentially spaced arcuate grooves formed therein. Each of the grooves is shaped to receive a preselected number of the bolt heads when the ring is positioned against a corresponding flange. A second surface of the ring opposite the first surface includes a plurality of apertures extending through the ring to the first surface with each of the apertures being located between a respective adjacent pair of the arcuate grooves. Each aperture has a countersunk portion on the second surface. The shield is attached to the flange by passing at least some of the bolts through the apertures with the bolt heads recessed in the countersunk portion such that a top of the bolts is flush with the second surface. The other bolt heads are contained within the arcuate grooves on the first surface of the ring.

6 Claims, 2 Drawing Sheets

WINDAGE SHIELD

The present invention relates generally to gas turbine engines and, more particularly, to an improved windage shield for minimizing temperature rise associated with protrusions in a fluid flow path.

BACKGROUND OF THE INVENTION

U.S. Pat. No. 4,190,397 assigned to the assignee of the present invention describes in detail the need for and use of windage shields in gas turbine engines. In particular, it is pointed out in that patent that efficiency of the engine can be shown to be directly related to the ability of the engine to operate at higher turbine inlet temperatures. This need for higher turbine operating temperatures has required cooling air to be supplied to various components of the engine in order to allow the components to operate at the higher temperatures without damaging thermal stress. In order to supply cooling air to these components at a temperature which is effective to lower the temperature of the operating components, cooling air is extracted from a compressor section of the engine and routed through various channels to the turbine section. As the cooling air is subjected to work input in passing through these channels, the temperature of the cooling air rises. Elements which have been found to significantly affect work in the cooling fluid flow are nuts and bolt heads utilized in connecting various sections of the turbine together. These nuts and bolt heads protrude into the cooling air channels creating "drag" and cause the cooling fluid to change velocity in such a manner that cooling air receives more work. The aforementioned U.S. Patent describes a windage shield which improves the performance of gas turbine engines over prior windage shields. The windage shield described therein is particularly useful with bolted flange connections which protrude into the fluid flow passage and are connected together by bolts with heads in the fluid flow passage. The described windage shield comprises a continuous ring of generally L-shaped profile which is captured between the bolt head and the upstream most flange. The captured flange portion of the shield is provided with a plurality of circumferentially spaced milled slots contoured to receive D-shaped bolt heads. These bolt heads are mounted flush with the upstream captured portion of the shield, thus eliminating open access holes and protruding bolts. The combination of D-shaped heads and contoured slots provides a means for torquing the bolts. The cylindrical section of the L-shaped shield extends downstream of the mating flanges and pass the nut side of the bolted connection to direct cooling air past the nut, thereby minimizing velocity reduction from the nut.

While the invention as described in the aforementioned U.S. Pat. No. 4,190,397 is effective to reduce windage effects within the fluid flow channel of a gas turbine engine, the windage shield described in that patent does require that a plurality of contoured slots be machined in the surface of the windage shield facing the fluid flow path and also requires that the heads of the bolts fit into the precision machined slots of the shield. Furthermore, the described windage shield has an L-shaped cross-section with a portion which extends parallel to the direction of fluid flow within the fluid flow channel with the described intent of directing the main fluid flow past bolt heads on the opposite side of the bolted flange. However, this extended portion does not eliminate flow over the bolt heads due to secondary circulating fluid fields. Thus, it would be desirable to have a windage shield which does not extend into the fluid flow channel and which does not require the specialty designed bolt heads or a plurality of precision machined slots for receiving each of the bolt heads and which accommodates secondary fluid flows.

SUMMARY OF THE INVENTION

Accordingly, it is a primary object of the present invention to provide an improved windage shield for use in gas turbine engines to minimize temperature rise in cooling fluid flow due to protrusions and, more particularly, to nut and bolt protrusions associated with the flange connections in the coolant flow path.

The above and other objects and advantages are attained in an improved windage shield for use with bolt head flange connections having bolt heads and nuts which protrude into a fluid flow channel. The shield of the present invention comprises a continuous ring of substantially rectangular cross-section which is formed with a plurality of circumferentially spaced arcuate shaped grooves on a first surface of the ring, which grooves are oriented such that the ring may be positioned over the bolt heads and the bolt heads within the grooves in the ring. A plurality of apertures is formed through the ring with the apertures aligned in the spaces between adjacent ones of the grooves. Each of the apertures has a countersunk portion on an outward side of the ring opposite the side containing the grooves. At least some of the bolts connecting the flanges together extend through the ring at the apertures for holding the ring in position over the bolt heads. The bolts extending through the ring have their heads recessed into the countersunk areas with the top of the bolt heads lying flush with the outer surface of the ring. Preferably, the countersunk portions fit snugly around the bolt heads to minimize the area of any cavity which could be exposed and lead to disturbance in the fluid flow path. The ring is so designed that when placed in its operative position over the bolt heads, the lower surface of the ring in which the grooves are formed fits snugly against the flange and one edge of the ring also abuts the annular member to which the flange is attached. This feature prevents fluid from passing under the windage shield and also minimizes the opportunity for fluid to come between the member and the windage shield. If desired, at either edge of the windage shield may be tapered to provide better aerodynamic characteristics.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
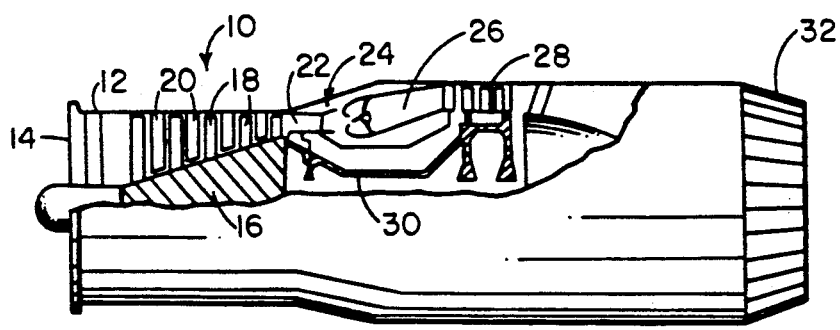
FIG. 1 is a view in partial cross-section of a gas turbine engine with which the present invention may be utilized.

Referring to the drawing wherein like numerals correspond to like elements throughout, reference is initially directed to FIG. 1 wherein a gas turbine engine depicted generally at 10 is diagrammatically shown. The engine 10 includes a casing 12 forming an air inlet 14, a compressor rotor 16 having rows of rotor blades 18 interspaced between rows of stationary stator vanes 20, which are affixed at their outer ends to the inner surface of the housing 12. At the downstream end of the compressor 16 is a row of compressor outlet guide vanes (OGV's) 22, followed by an annular diffuser passage or compressor discharge passage indicated generally at 24. The diffuser passage 24 discharges the pressurized air into a combustor 26 from whence the heated products of combustion pass through and drive turbine 28 which, in turn, drives the compressor 16 through shaft 30 in the usual manner of a gas turbine engine. The hot gas stream is then discharged through a nozzle 32 to provide the propulsive force of the engine.

The above description is representative of a gas turbine engine and is not meant to be limiting, as it will become readily apparent from the following description that the present invention is capable of application to any gas turbine engine and is not meant to be restricted to engines of the turbojet variety. For example, the subject invention is applicable both to engines of the gas turbo-fan type and to advanced mixed cycle engines as will be readily apparent to those skilled in the art. The above description of the engine depicted in FIG. 1 is, therefore, meant to be illustrative of one type of application.

Figure 2:
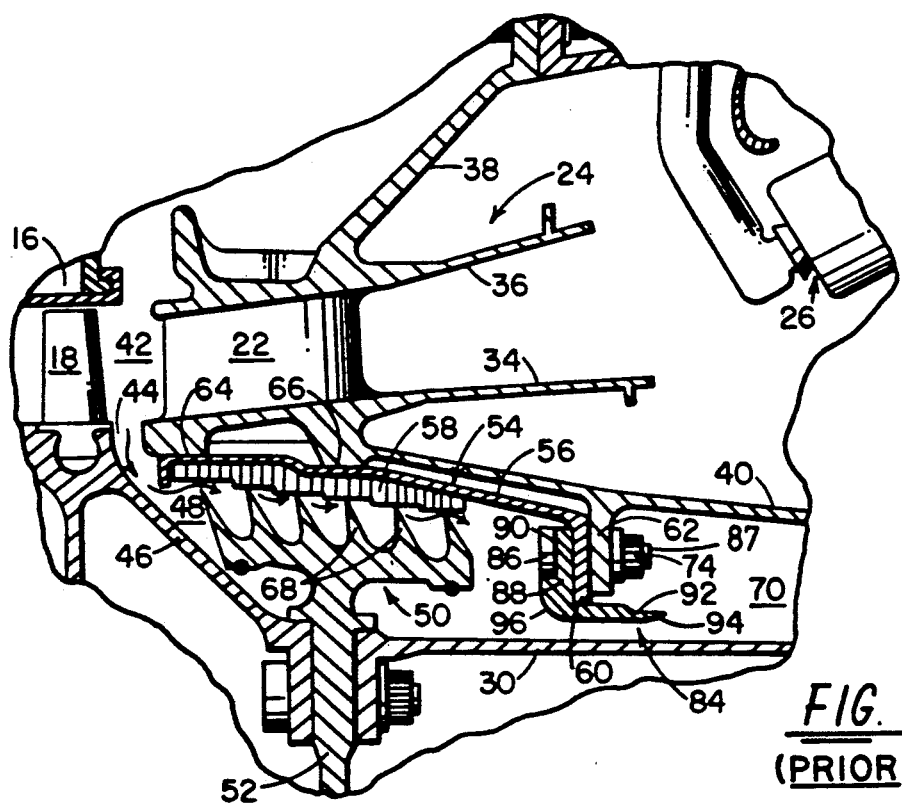
FIG. 2 is an enlarged view of a portion of the engine of FIG. 1 illustrating the use of a windage shield characteristic of the prior art.

Directing attention now to FIG. 2, it will be observed that diffuser 24 comprises a pair of concentric inner and outer walls 34 and 36, respectively, divergent in the downstream direction and formed integrally with the stage of outlet guide vanes 22. A diffuser outer frame 38 and a diffuser inner frame 40 support the outlet guide vanes as shown in the proper relationship between upstream compressor 16 and downstream combustor 26. As discussed previously, the turbine portion of the gas turbine engine is typically cooled by air pressurized by the compressor. This coolant air is bled from the compressor flow path 42 through an annular gap 44 between the last stage of rotor blades 18 and outlet guide vanes 22 and thereafter flows along frustoconical rotor member 46 into passage 48. The coolant flow rate is metered by the compressor discharge pressure (CDP) seal 50 which comprises a rotating seal portion 52 and a stationary seal portion 54. The CDP stationary seal portion 54 is associated with the diffuser inner frame 40 and is configured for replaceability in event of excess seal wear. This stationary seal portion comprises a rigid seal support upon which a honeycomb seal material 58 has been bonded in a step-wise manner as indicated. The CDP stationary seal portion 54 is supported from diffuser inner frame 40 by means of radially inward extending flanges 60, 62 which are bolted together as shown and also by means of abutting contacts between the seal support 56 and diffuser inner frame 40 at 64 and 66. CDP rotating seal member 52 is captured between frustoconical compressor rotor member 46 and shaft 30 as indicated and comprises a plurality of axially spaced annular labyrinth seal teeth 68 which extend into close proximity to honeycomb seal material 58. In order to obtain the desired metered amount of coolant flow, and yet minimize overall engine performance degradation, seal 50 is designed to operate with minimal running clearances between the labyrinth seal teeth 68 and stationary honeycomb seal material 58. This minimal clearance causes a temperature rise in the air passing through the seal as indicated by the arrows so that the air exiting the seal has already lost some of its useful cooling capacity prior to entering annular passageways 70 between shaft 30 and diffuser inner frame 40 from whence it is routed through the turbine in a manner well known in this art.

A windage shield 84 in accordance with the aforementioned U.S. Pat. No. 4,190,397 is shown to comprise a continuous ring (but could be circumferentially segmented) of generally L-shaped cross-section which is captured between a modified bolt head 86 of a bolt 87 and the upstream flange 60. The captured portion 88 is provided with a plurality of circumferentially spaced recessed regions in the form of milled slots 90 of generally D-shaped profile. Modified bolt heads 86 are of a similar contour and are adapted to be received and retained in the milled slots so that the bolt is restrained against rotation by the sides of the milled slots. The thickness of the bolt heads and the depth of the slots are similar so that the bolt heads are flush-mounted within and therefore form a generally flush interface with the surrounding surfaces of the upstream captured side of the shield, thus eliminating open access holes and upstream protruding bolt heads 86. A cylindrical section 92 of the L-shaped shield 84 extends downstream of the mating flanges 60, 62 and past the downstream nut side of the bolted connection to direct the flow of cooling air past nut 74, thereby minimizing churning of the coolant by the nut. The length of the cylindrical section 92 need be just sufficient to guide the flow past nut 74, and the section may be contoured as at 94 to provide diffusion and turning of the flow into passage 70. The transition between the captured portion 88 and the cylindrical section 92 is shown to incorporate a large turning radius section 96 to further reduce windage losses. Since the cylindrical section is a 360° shell, gaps between segments are also eliminated.

Figure 3:
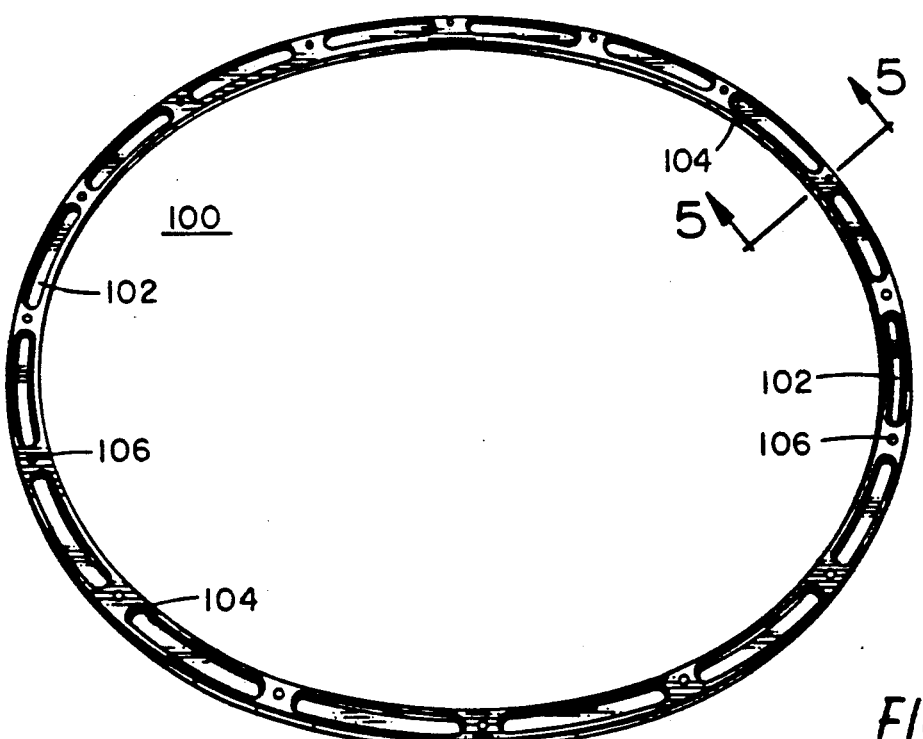
FIG. 3 is a perspective view of a lower or first side of a windage shield in accordance with the present invention.
Figure 4:
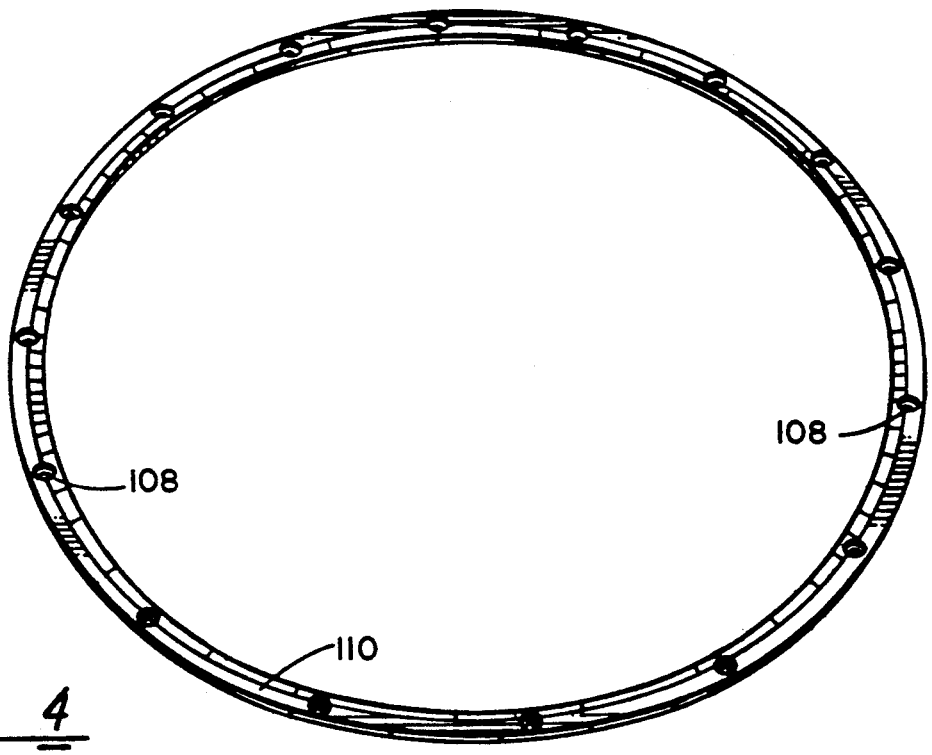
FIG. 4 is a perspective view of an outer or second side of the windage shield in accordance with the present invention.

While the aforedescribed windage shield provides improvement over other shields, continued demand for more efficient gas turbine engines has required shields with even better characteristics, and, in particular, shields which provide improved flow characteristics in circulating or secondary flow paths. FIGS. 3 and 4 are perspective views of a windage shield 100 in accordance with the teachings of the present invention. In particular, the shield 100 comprises an annular ring having a substantially rectangular cross-section. A plurality of circumferentially spaced, arcuate grooves 102 are formed in a first or inward surface 104. The grooves 102 are oriented and shaped to fit over at least some of the bolt heads 86, although the bolt heads need not be modified to any special configuration. Between each adjacent pair of grooves 102 is an aperture 106 having a diameter sufficient for passage of a shank of the bolts 87. Each aperture 106 has a countersunk portion 108 on a second side or surface 110 of the shield opposite the first surface in which the grooves 102 are formed. The countersunk portion 108 has sufficient depth that when installed on the flange 60, the top of a bolt head 86 will lie flush with the surface 110. The diameter of each portion 108 is approximately the same as the bolt head in order to minimize any open cavity. However, the diameter of the countersunk portion can be made just sufficient to accept a socket for tightening a standard bolt head or the portion may be shaped to tightly fit the bolt head with restraint of the bolt during tightening relying on either a lock washer or a special fitted shape.

Figure 5:
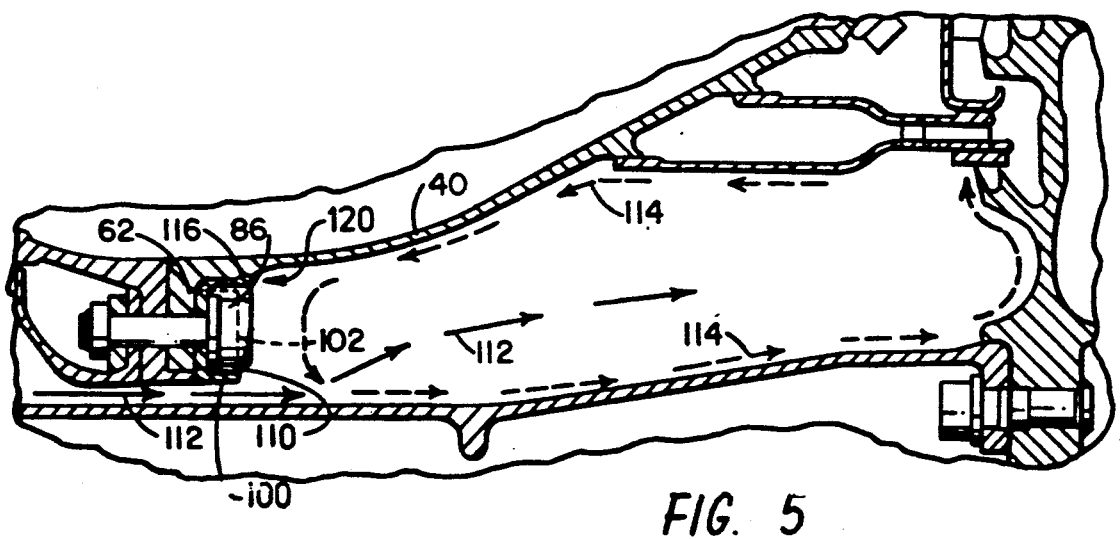
FIG. 5 is a cross-section of the windage shield of FIG. 3 taken along the lines 5—5.

Referring to FIG. 5, there is shown a simplified cross-sectional view similar to that of FIG. 2 in which a windage shield 100 is installed. A primary fluid flow path is indicated by arrows 112 and a secondary circulating fluid flow path is indicated by arrows 114. The bolt heads 86 fit within grooves 102 with the outer surface 110 providing a smooth flow path for the secondary flow. The inward surface 104 abuts tightly against the flange 62 while an edge 116 abuts against the annular member 40. The edge 116 may be formed with a raised head as shown or have any other shape suitable for mating with member 40 and preventing formation of any cavities.

The exposed bolt heads at stationary bolted joints in the proximity of rotating structures have been primarily shielded to protect them from erosion due to high speed particular matter in the fluid flow path. Windage shields that have developed from these protective shields have not uniformly eliminated leakage paths which might exist within the shields that permit the cooling air to recirculate within the shield and over the bolt heads thereby dragging down the tangential velocity component of the cooling fluid. Generally, this process occurs because the recirculating air about the shield eventually leaks back into the main fluid flow and results in a temperature rise of the cooling air. This temperature rise is the result of work done on the recirculating air driving up this tangential velocity back to that of the main fluid flow. The above described invention provides a full 360° shield recessed on one side to completely cover the majority of bolts utilized in joining the flanges within a gas turbine engine. A selected few of the bolts joining the flange are then used to attach the shield to the flange. The heads of the bolts attaching the shield are arranged to sit in totally dead-ended pockets that allow for no recirculation of cooling fluid. The sockets or countersunk portions are so designed that bolt heads sit flush with the face of the shield thereby presenting a relatively smooth surface minimal drag. As shown in FIG. 5, the shield maintains a tight fit at all interfaces with the flange and the adjacent structure of the engine. In comparison to the prior shield illustrated in FIG. 2, it can be seen that a recirculating path would be affected by the bolts or nuts on the downstream side of the primary fluid flow path and by the extension 92 of the L-shaped flange which is provided to assist in developing a smooth flow path for the main fluid flow as indicated by the arrows 112. In the embodiment of the invention as illustrated in FIG. 5, the extending section of the forward shield has been eliminated and the bottom of the flange 62 is formed coextensive with the bottom of the forward shield and the bottom of the aft shield.

While the invention has been described in what is presently considered to be a preferred embodiment, other modifications and variations will become apparent to those skilled in the art. It is intended therefore that the invention not be limited to the specific embodiment but be interpreted within the full spirit and scope of the appended claims.

What is claimed is:

1. A windage shield for use in a fluid flow path within a gas turbine engine for reducing fluid drag generated by fluid flow over a plurality of circumferentially spaced fasteners each having a portion thereof extending into the fluid flow path, the windage shield comprising an annular member having a first plurality of circumferentially spaced arcuate openings in a first side thereof, said openings being arranged to receive at least some of the portions of the fasteners extending into the fluid flow path, said shield further including a second plurality of circumferentially spaced apertures, at least one of said apertures being located between each adjacent pair of said openings and each aperture including a countersunk portion on a second side of said shield opposite said first side, each of said apertures being adapted to receive a headed fastener for attaching said shield over said at least some of the portions of the fasteners extending into the fluid flow path with a head of each said headed fastener lying substantially flush with said second side of said shield in said countersunk portion, said second side of said shield providing a substantially continuous surface to said fluid flow path for minimizing windage heating.

2. The windage shield of claim 1 wherein said spaced fasteners extend through and above a surface of an annular flange, and wherein said first side of said shield is formed to mate in a sealing relationship with said surface of said flange for inhibiting fluid flow therebetween.

3. The windage shield of claim 2 wherein said second side of said shield is tapered on at least one annular edge for reducing fluid drag thereover.

4. The windage shield of claim 2 wherein said countersunk portion of said apertures fits loosely about a corresponding head of said headed fasteners.

5. The windage shield of claim 2 wherein said flange extends radially from an annular member oriented substantially axially of the gas turbine engine, an edge of said shield extending into contact with said annular member for blocking fluid flow between said member and said shield.

6. A Windage shield for use with a pair of annular members oriented in an abutting end-to-end arrangement to define one boundary of a fluid flow path, each of the members having a radially extending flange at their respecting abutting ends for coupling the members to each other, said flanges being coupled by a plurality of circumferentially spaced bolts having a head and a nut which protrude into the fluid flow path, said windage shield comprising an annular ring having a first surface with a plurality of circumferentially spaced arcuate grooves formed therein, each of the grooves being shaped to receive a preselected number of the bolt heads when the ring is positioned against a corresponding flange, a second surface of the ring opposite the first surface includes a plurality of apertures extending through the ring to the first surface, each of the apertures being located between a respective adjacent pair of the arcuate grooves and each aperture having a countersunk portion on the second surface, the shield being attached to the flange by passing at least some of the bolts through the apertures with the bolt heads recessed in the countersunk portion such that a top of each of the at least some of the bolts is flush with the second surface, and others of the bolt heads being contained within the arcuate grooves on the first surface of the ring.

* * * * *